Figure 3:
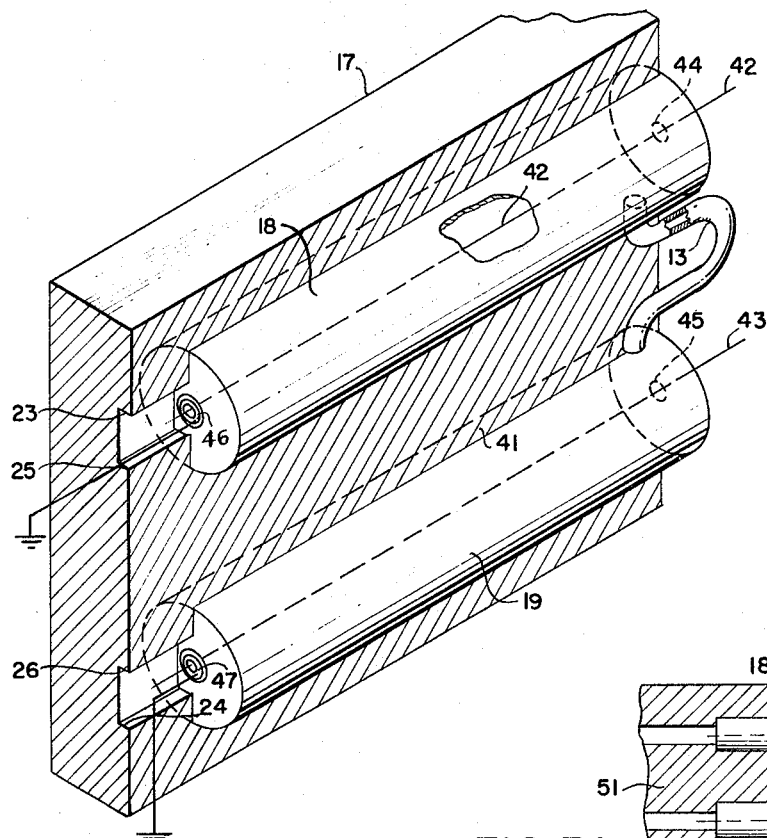

Oct. 4, 1966  S. BERNSTEIN  3,277,329
BALANCED GASEOUS RADIATION OR PARTICLE DETECTORS
Filed Oct. 31, 1961  2 Sheets-Sheet 1
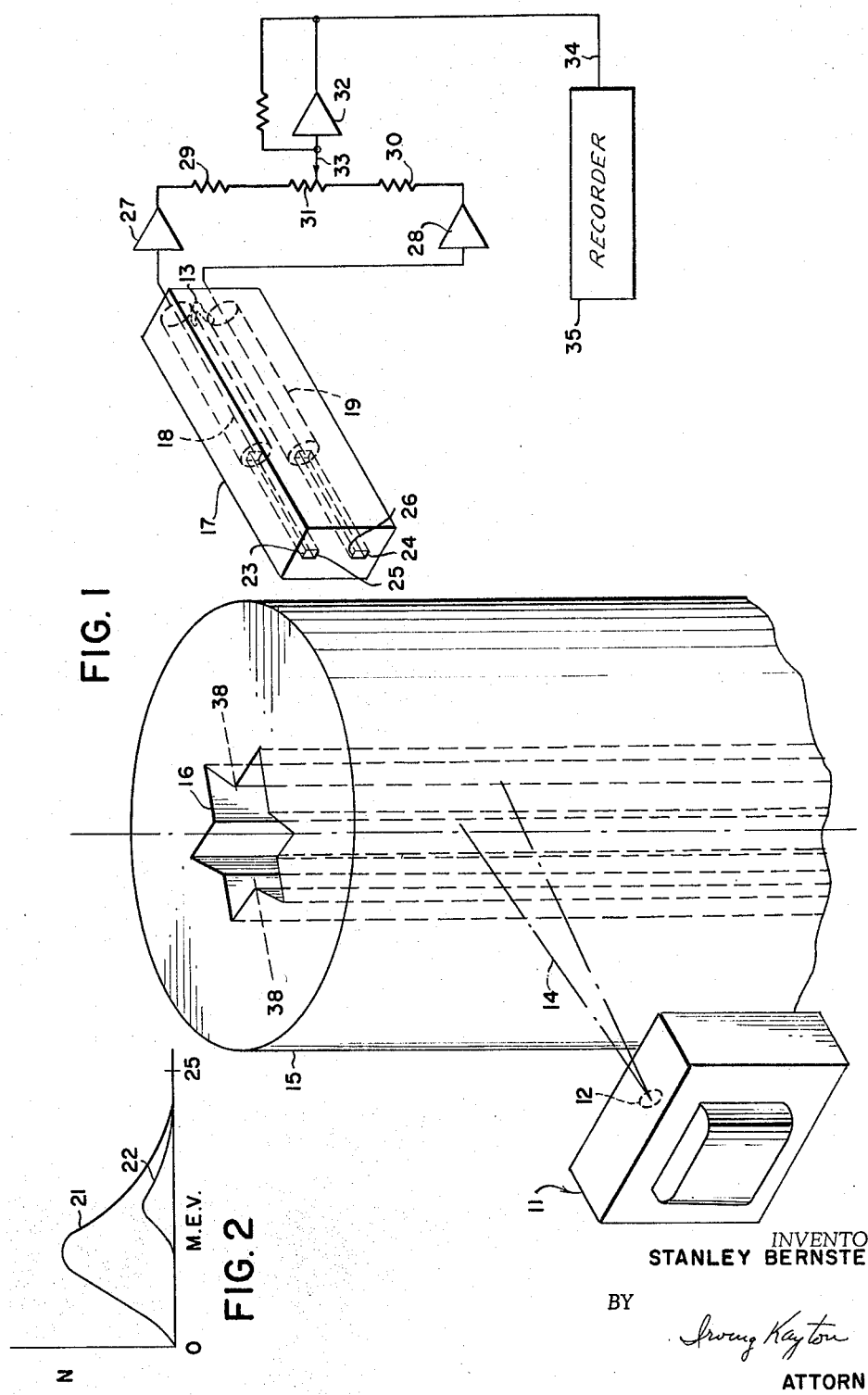
INVENTOR.
STANLEY BERNSTEIN
BY
Irving Kayton
ATTORNEY Oct. 4, 1966  S. BERNSTEIN  3,277,329
BALANCED GASEOUS RADIATION OR PARTICLE DETECTORS
Filed Oct. 31, 1961  2 Sheets-Sheet 2

INVENTOR.
STANLEY BERNSTEIN
BY
Irving Kayton
ATTORNEY

United States Patent Office 3,277,329
Patented Oct. 4, 1966

3,277,329
BALANCED GASEOUS RADIATION OR
PARTICLE DETECTORS
Stanley Bernstein, Milwaukee, Wis., assignor to General
Electric Company, a corporation of New York
Filed Oct. 31, 1961, Ser. No. 149,107
5 Claims. (Cl. 313—93)

This invention relates to gaseous detectors used for detecting high energy particles or radiation, or both, and more particularly, in a preferred embodiment, to a system of two ionization chambers used together as balanced detectors.

It is known in the art to utilize two relatively closely spaced ionization chambers, in inspection systems, for the purpose of ascertaining whether an object in the form of a sheet of metal or the like has disposed therein flaws in the form of slits, cracks, holes, internal or surface pits, or other undesirable structural characteristics such as non-uniform density or thickness. Often, X-radiation is used as a ray penetrating medium through the object to be received by the detectors. The detector ionization chambers and output comparison or difference network are balanced relative to each other as accurately as possible, such that there is ordinarily a null indication from the difference network. Consequently, when a flaw in the object passes in front of one of the detectors, an imbalance results in the amount of penetrating ray energy which reaches the ionization chambers, with the concomitant result of an imbalance in the output of the two chambers. In such an arrangement, this imbalance, and therefore the variation from the null reading that ordinarily obtains, indicates that some kind of flaw exists. In short, when one of the detectors views something different from that simultaneously viewed by the other ionization chamber, an output signal is generated in the comparison network. The sign or polarity of the signal indicates which of the two detectors has viewed the change.

In such a system, it is clearly necessary that the ionization chambers be balanced as closely as is possible, to avoid the generation of spurious flaw indications. Ionization chambers may be balanced relative to each other by insuring that the sizes, in a volumetric sense, of the two chambers are as equal as possible, and that the same gases under the same pressures are used for both, and finally, that a balancing potentiometer in the output comparison circuit is calibrated such that any inherent imbalance in the characteristics of the two ionization chambers is compensated. These means for obtaining balanced ionization chambers and ionization chamber outputs are satisfactory in situations wherein the energy level of the particles or radiation which enter the ionization chambers is relatively low, or when the dynamic operating range of the system is such that the energy which reaches the ionization chambers is confined to a very narrow frequency or energy spectrum.

Where, however, the ionization chambers are used as detectors in inspection systems wherein the particles or radiation detected vary over a wide range of energy levels which includes an extremely high level, the techniques discussed above for balancing the ionization chambers fall short of providing a balance which is adequate for certain important applications of balanced detector inspection systems. For example, in my copending application, Serial No. 104,649, filed April 21, 1961, entitled "Flaw Detection Method and Apparatus," there is disclosed a flaw detection system utilizing two ionization chambers for inspecting large objects having irregular internal configurations such as, for example, the solid fuel motor portion of intercontinental ballistic missiles and related types of solid fuel missiles, such as the "Minute Man" and "Polaris" missiles. The motor section of such missiles comprises a right cylindrical section approximately twenty feet in length and five feet in diameter, having a longitudinally extending internal void with a complex geometry in the form of a six-pointed star aperture or hollow in transverse cross-section. Such an object is examined by rotating the cylinder and simultaneously moving it translationally parallel to its longitudinal axis such that a helical scanning pattern is described on the surface of the cylinder. Penetrating radiation passing through such an object, therefore, cyclically passes through thicker and thinner portions of the cylinder, depending upon which part of the internal six-pointed star void is subject to examination at the moment. In order for the penetrating X-radiation to pass through such a huge object, the energy must be at an extremely high level, and a portion of it is, in fact, as high as twenty-five million electron volts, even on exiting the test object. A large amount of lower energy radiation is received by the two detector system when the least amount of material in the test object is passing under the scanning view of the detectors. When a very large amount of material is passing under the scanning view, a substantially smaller amount of radiation is received by the ionization chambers, but the average energy level is much higher.

Under these circumstances, ionization chambers are required which are capable of absorbing high energy level radiation. This means that ionization chambers are required with gas pressures that are considerably higher than are ordinarily utilized, in order that the radiation received be absorbed, and ionization accomplished.

When such high pressures are used in the ionization chambers, the balancing of the detectors has been empirically ascertained, and is theoretically demonstrable to be, a much greater problem than can be solved by the ordinary technique of using a trimming or balancing potentiometer in the output comparison network. Thus, when two balanced detectors are required to provide an output null indication over a large range of energy levels, the mere balancing of the detectors with a potentiometer in the output circuit for one energy level does not provide a null indication for all of the energy levels unless the gas pressure within the two ionization chambers is precisely identical.

The efficiency of an ionization chamber is determined in part by the pressure of the gas within the chamber. This efficiency is also directly related to the amount of radiation which is absorbed within the chamber. A higher pressure of gas produces greater absorption and greater ionization with consequent increased output. Quantitatively, the gas pressure affects the exponent of an exponential equation defining the efficiency of the chamber. Where the exponent is small the efficiency is proportional to the gas pressure. However, where the exponent is large, this is not true. Thus, the efficiency curve is approximately linear at low values of the exponent (which is a function of gas pressure and magnitude of applied radiation) and departs more and more from linearity until it finally reaches or closely approaches a limiting value equal to one hundred percent efficiency.

With two ionization chambers wherein the exponent is large, due to high radiation levels and high gas pressures, operation occurs in the non-linear region descriptive of the efficiency of the chambers. A small difference in gas pressures as between two ionization chambers operating in this region constitutes a difference between the exponents defining the efficiency curves for the two chambers. This small difference in the non-linear region of the curves, however, constitutes a substantial difference, not only in the displacement between the two non-linear efficiency curves, but also in the basic shapes of those curves.

Thus, for example, with slightly different gas pressures in two ionization chambers, the magnitudes of the efficiency curves for the two chambers become increasingly different from each other as the efficiency curves proceed in the direction of increased applied radiation.

Clearly, a simple fixed compensating resistance in an output comparison circuit cannot render the two outputs of such ionization chambers equal over the entire operating range of the system. Thus, in order to obtain an accurate balance of the output between the two ionization chamber detectors, it is necessary that their sensitivities "track" over the entire energy range. It is therefore necessary that the gas pressures in the two detectors be as close to identical as possible. It has been found to be extremely difficult to make the pressures within two separate and distinct ionization chambers sufficiently identical such that an output null can be maintained over a very large range of energy levels in the ordinary course of operation.

There are known in the art, bi-cameral ionization chambers wherein a single ionization chamber shell is utilized with a division therein, so that the two chambers share the same gas and gas pressure. Such a structure is unsatisfactory for the requirements of a system such as described above, wherein high energy level particles or radiation must be detected, since the ionization in one chamber may readily trigger off ionization in the second chamber, with a resultant spurious indication from the second chamber. As disclosed in my above identified copending patent application, it is essential to provide a heavy atomic weight material, such as lead, to act as a shield between the two ionization chambers for the very purpose of precluding the possibility of ionization in one chamber triggering off ionization in the second chamber. Consequently, the unitary shell, bi-cameral ionization chambers known in the prior art cannot satisfy the requirements of such a system.

It is the primary object of this invention to provide balanced ionization chambers for detecting particle or radiation energy levels that cover a wide range in ordinary operation, and which at the higher energy levels are sufficiently great to require gas within the ionization chambers that is under a pressure of several atmospheres.

It is another object of this invention to provide balanced ionization chamber detectors which are capable of providing a null indication over a large range of energy level operation.

It is still another object of this invention to provide balanced ionization chamber detectors for operation with high energy level particles or radiation wherein the excitation of one ionization chamber is effectively isolated in its effect from that of the second ionization chamber, such that the operation of neither can trigger off the operation of the other.

The above objects are accomplished in accordance with the principles of the invention by utilizing two distinct ionization chambers with heavy shielding in between the chambers, and wherein the two distinct chambers form a single closed system by virtue of a tube interconnecting the two chambers such that precisely equal gas pressures are maintained within the two chambers under all conditions of operation, thereby insuring precisely the same sensitivity in each of the two chambers under all operating conditions.

A feature of this invention, which is instrumental in insuring that under no circumstances can the ionization occurring in one chamber trigger ionization in another chamber, is the non-linear shape of the connecting tube between the two chambers. By having the connecting tube curved, there is no direct line of sight between any point in one chamber and a point in another chamber. Therefore, particles or radiation resulting from the excitation of one chamber cannot pass directly through the pipe into the other chamber, but rather can only penetrate a portion of the depth of the inconnecting pipe and then must pass through shielding material if they are to get to the second ionization chamber at all.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings.

Figure 3A:
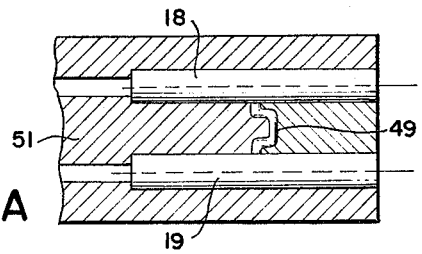
Figure 3B:
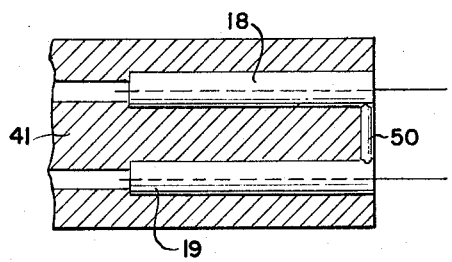
Figure 3C:
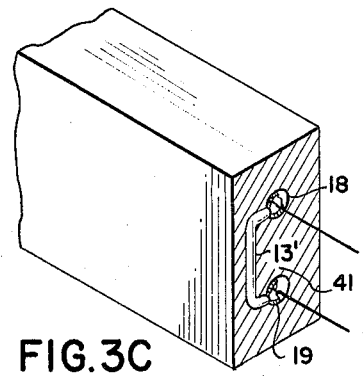

FIGURE 1 represents a block-diagram of an X-ray flaw detection system utilizing the balanced detector system in accordance with the principles of the invention;

FIGURE 2 provides curves representative of X-ray energy distributions which occur in the system of FIGURE 1;

FIGURE 3 is an enlarged cut-away view of the pressure balanced dual ionization chamber system in accordance with the invention which is shown in less detail in FIGURE 1; and FIGURES 3A, 3B and 3C are alternative arrangements for the system of FIGURE 3.

Referring with greater detail to FIGURE 1, there is disclosed a preferred embodiment, shown for purposes of illustration, of a flaw detection system utilizing balanced ionization chambers in accordance with the invention. In this application of the balanced chambers, the object subject to flaw detection is one which is very large and has a complicated internal cross-section. It requires, therefore, a source of hard penetrating rays, and detectors capable of sensing the hard rays that emerge from the penetrated test object. X-rays are the penerating rays utilized in the embodiment of FIGURE 1 for the flaw detection function. Considering FIGURE 1, then, there is disclosed as a source of hard X-radiation, the betatron 11. Betatron 11 and its output window 12 are arranged such that a fifteen degree conical beam 14 of X-radiation passes to the right.

Typically, the output of betatron 11, which may be measured prior to its passage through test object 15, is capable of a twenty-five million electron volt level. A distribution curve 21 of the energy output of betatron 11 is shown in FIGURE 2, wherein the abscissa is the energy level in millions of electron volts and the ordinate represents the quantity of radiation, or photon flux. Curve 22 represents the effective radiation which remains after beam 14 passes out of test object 15. These curves show that the lower energy level X-rays are absorbed by test object 15 and only very high energy level radiation is available at the output or right-hand side of the cylinder 15. Consequently, the ionization chamber detectors that receive X-radiation passing out from the test object 15 must be capable of operating at very high energy levels.

Disposed to the right of rocket motor 15 and on the opposite side thereof from betatron 11, is a housing 17 which includes ionization chambers 18 and 19, which forms a single closed system by virtue of the interconnecting tube 13. The X-radiation 14, emerging from test object 15, communicates with chambers 18 and 19 through two apertures 23 and 24, respectively. Housing 17 is preferably metal having a heavy atomic weight, such as lead, which effectively serves as a filter and attenuator for X-radiation. In this way, the only X-rays reaching the ionization chambers 18 and 19 do so through the apertures 23 and 24, respectively. Considering the general geometric relationship of the apertures 23–24, the ionization chambers 18–19, and the housing 17, it may be seen that the housing 17 is essentially a solid right parallelepiped with the apertures 23 and 24, in any transverse cross-section, having a rectangular shape. Apertures 23–24 are disposed vertically, one above each other, and are preferably dimensioned one inch vertically and one-half inch horizontally, with the most adjacent edges, 25 of aperture 23, and 26 of aperture 24, spaced from each other two inches. Apertures 23 and 24 extend to the right into housing 17, a distance of approximately eight inches.

The function of apertures 23 and 24 is to collimate the X-rays entering them, after their exiting from the test object 15. The X-rays thus pass as parallel rays through the apertures and exit in that form at the right hand ends of the apertures. The length of the apertures and the distance from the X-ray source 11 results in the apertures properly functioning as collimators. To insure that the collimating function is properly performed, however, it may be desirable to include in the apertures X-ray collimating slits, sometimes referred to as Soller slits. These slits, which are well known in the art, comprise an array of thin lead sheets, or sheets of heavy atomic weight, which are spaced from each other and arrayed with their faces parallel to each other and to the direction in which the collimation is to be performed.

The collimation provided by apertures 23 and 24 results in parallel beam X-rays emerging at the right-hand end of the apertures, and impinging on and passing into the ionization chambers 18 and 19, respectively. In a similar way, the function of the apertures 23 and 24 may be viewed in the reverse conceptually. Thus, a field of view, in the form of a small rectangular area, may be projected on to (and through) test object 15 from each of the apertures 23 and 24. In essence, then, the apertures 23 and 24 define a field of view on the surface of, and through the volume of, cylinder 15 in a manner such that the ionization chambers 18 and 19 can be visualized as looking on and through the test object 15 with the field defined by the shape of apertures 23 and 24.

The ionization chambers 18 and 19 are right cylinders, approximately ten inches in length and two inches in diameter. They are subjected to high X-ray energy levels, represented by curve 22 of FIGURE 2, having an effective radiation of approximately ten million electron volts. They are, therefore, designed so as to sense a sufficient portion of this high energy X-radiation. Thus, the ionization chambers 18 and 19 are typically filled with Xenon, which is one of the heavy atomic weight inert gases, at a pressure of ten atmospheres. The size and shape of the two ionization chambers are made as closely similar to each other as possible, so that the ionization chambers will be as closely balanced detectors as is possible. Since the tube 13 between the chambers insures that identically the same gas pressure exists in both chambers, precisely equal sensitivities of the two chambers are insured. These ionization chambers are cylindrical in shape, so as to sustain the ten atmosphere pressure of the enclosed Xenon.

The electrical outputs of detectors 18 and 19 are connected to the preamplifiers 27 and 28, respectively. Amplifier 27, however, is adapted to provide an output voltage signal of opposite polarity to that of amplifier 28, in a manner well known to those skilled in the art. Preamplifiers 27 and 28 are drift-compensated D.C. operational amplifiers, well known to those skilled in the art. The voltage outputs of amplifiers 27 and 28 are connected through scaling resistors 29 and 30, respectively, and thence through a balancing potentiometer 31 to a summing amplifier 32. Amplifier 32 has a feedback resistor which, in combination, performs the typical D.C. analog computer summing function. Resistors 29 and 30 are of equal values and perform the function of input scaling resistors to the summing amplifier 32.

Wiper 33 wipes across potentiometer 31 and may be used to balance the signals received thereat from the scaling resistors 29 and 30. In this way, any slight difference between the characteristics of amplifiers 27 and 28 may be balanced out. The output of the summing amplifier 32 is then applied, via conductor 34, to a typical recording device 35.

The operation of the tube-connected ionization chambers 18–19, in the system of FIGURE 1 may be properly comprehended. The portion of beam 14 which emerges from object 15 enters apertures 23 and 24 which, because of their identical size and geometry and because of their viewing precisely the same configurations of object 15, permit the entrance of substantially equal amounts of photon flux (assuming no flaw is being observed), which in turn is sampled by ionization chambers 18 and 19, respectively. The outputs of the ionization chambers 18 and 19 are amplified by preamplifiers 27 and 28, respectively. Because of the phase inversion provided by amplifier 27, the output voltages from the two amplifiers are added algebraically through the equal valued scaling resistors 29 and 30 and summing amplifier 32, to provide a null signal on conductor 34 and a null indication on recorder 35. It should be noted that the null indication will continue to remain a null, even if there is fluctuation in the photon flux output of the betatron 11, and despite the variations in emerging photon flux from object 15 due to the rotation of object 15, since each of the pressure-balanced ionization chambers 18 and 19 will experience precisely the same variation as the other.

FIGURE 3 illustrates the two balanced ionization chambers 18 and 19 in their housing 17 in greater detail. It may be seen that the ionization chambers 18 and 19 are interconnected through the curved tube 13, one end of which opens into chamber 18 and the other end of which opens into chamber 19. It may be noted that both ionization chambers are completely encompassed by the lead housing 17, such that between chambers 18 and 19 is disposed a heavy shielding portion 41 of lead. This lead portion 41 is integral with lead housing 17, but need not be so. Thus, for example, housing 17 may comprise the arrangement shown, with the exception that lead portion 41 may be separable from the housing and insertable as a bar or shaft into a slot that would exist within housing 17.

Each of ionization chambers 18 and 19 comprises a closed, right cylindrical shell, preferably made of steel, to sustain the heavy gas pressures within the cylinders. The steel shell of the ionization chamber constitutes one of its electrodes. The second electrode of the ionization chamber, which is coupled to the output comparison circuit in FIGURE 1, is in the form of a thin wire 42 in chamber 18, and 43 in chamber 19, which extends longitudinally through the entire length of the ionization chamber and is coincident with the longitudinal axis thereof. The left-hand ends of electrodes 42 and 43 may extend beyond the terminating left-hand faces of the ionization chamber. Electrodes 42 and 43 are insulated from the right-hand faces of their respective ionization chambers by insulating washers 44 and 45. In the left-hand faces of the ionization chambers, electrodes 42 and 43 are also insulated therefrom. However, grounded guard rings 46 and 47 are disposed concentric to electrodes 42 and 43, respectively, and in turn are insulated from electrodes 42 and 43, as well as from the end faces of the ionization chamber cylinders 18 and 19. Grounded guard rings 46 and 47 are used in the manner well known in the art in ionization chambers to preclude the possibility of any spurious signals being impressed upon the output of the ionization chambers. Effectively, the guard rings constitute a parallel impedance to the ionization chamber circuits themselves, such that serial voltages may not be spuriously superposed upon the output signals provided on output electrodes 42 and 43.

Interconnecting tube or pipe 13 has one end thereof opening into the shell of ionization chamber 18 at the extreme right-hand end thereof. Similarly, the other end of tube 13 opens into a similar location of the ionization chamber cylinder 19. The ends of tube 13 may be secured to their respective chambers in an appropriate manner such as by welding. Tube 13 is in the shape of a U-shaped curve, with the concave portion facing left. Because of this U-shape, ionization that occurs within either of the two cylinders 18 or 19 generates particles and radiation which cannot have a direct line of sight path between the two chambers through the tube 13. Thus, any particles or radiation excited in either of the two chambers must penetrate some portion of the lead shielding portion 41 between the two chambers before they can pass into the second chamber. Ionization chamber 18 and ionization chamber 19, as interconnected by tube 13, form an integral closed, gas-tight system, such that the gas pressure within any portion of the volume formed by the two cylinders and the tube is equal to the gas pressure anywhere else within the closed system. The diameter of the bore of tube 13 may be quite narrow, but should be wide enough so that gas from one chamber may flow freely from the tube into the other chamber without undue delay. In other words, the passage should be wide enough such that only a small amount of friction will be exhibited to fluid flow through the tube.

It may be noted that the ionization chambers fit into hollow cylindrical recesses of housing 17, and are seated therein. The location of the interconnecting tube 13 at the extreme right-hand ends of the cylindrical chambers insures that the ionization chambers may be seated within housing 17 without any structural interference from tube 13, although a small portion of the very right-hand end of lead shield portion 41 may be removed to accommodate the ends of tube 13. Nevertheless, at least a segment of lead shield 41 is located in, and fills the open end portion of, the U formed by tube 13.

The spatial arrangement of tube 13 relative to shield 41 and chambers 18 and 19 is designed so as to enable the insertion of the chambers into their respective recesses in housing 17 with a minimum of difficulty. Where structural considerations, however, dictate that interconnecting tube 13 be located elsewhere along the length of the ionization chambers, a structure such as is represented in FIGURE 3A may be utilized. In that figure, an interconnecting tube 49 is shown as disposed between the two cylindrical chambers at their midpoints. In such an arrangement, the lead shield portion 51 between chambers 18 and 19 is severable. Thus, the portion of housing 17 located to the left of tube 49 may be integrally fixed and secured with respect to housing 17; however, the righ-hand portion of shield 51, which is disposed to the right of connecting tube 49, may be separable therefrom, such that when chambers 18 and 19 with connecting tube 49 are inserted into housing 17, a lead bar or shaft may be inserted behind tube 19 parallel to the axes of ionization chambers 18 and 19. In this way, the entire volume between chambers 18 and 19 may be filled with lead shielding material. As shown by interconnecting tube 49, shapes other than the smooth, U-shape of tube 13 may be used. Thus, the interconnecting tube 49 forms a sharply defined irregular shape which is basically also U-shaped.

Although interconnecting tubes 13 and 49 are shown to be basically of an overall non-linear shape, it is to be understood that for certain applications, a straight line connection between the two chambers may be useful. In certain applications, the fact that there is a direct line of sight between the two chambers may not be of great moment, especially when the statistical incidence of "cross-ionization" between the two chambers may be relatively small compared to other effects of the system. In other words, the probability of cross-ionization may be so small compared to the other effects of the system, that the cross-ionization may be completely masked out. In such an arrangement, it may be desirable to have a straight pipe 50 interconnecting the two chambers, as shown in FIGURE 3B, even though a direct line of sight may be provided.

In FIGURE 3C, there is shown in transverse cross-section, an alternative arrangement to those of FIGURES 3, 3A and 3B. In this arrangement, a U-shaped interconnecting tube 13' connects chambers 18 and 19. However, the plane of tube 13' is transverse to the longitudinal axes of the chambers. In such an arrangement, a direct line of sight between the chambers is avoiding, without in any way interfering with, or removing any portion of, the lead shielding material 41 disposed between the chambers along their entire lengths.

While the principles of the invention have now been made clear in illustrative embodiments, there will be immediately obvious to those skilled in the art many modifications in structure, arrangement, proportions, the elements, materials and components used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and is desired to be secured by Letters Patent of the United States is:

1. A balanced detector system, comprising: first and second gas filled ionization chambers; a particle and radiation shielding element of high atomic weight metal disposed between at least a portion of said first chamber and a portion of said second chamber; and a tube interconnecting the volumes of said first and second chambers and forming an integral gas-tight system therewith; said tube having a shape which prevents a direct line of sight between said first and second chambers through said tube.

2. A balanced detector system, comprising: first and second gas filled ionization chambers; a particle and radiation shielding element of high atomic weight metal disposed between at least a portion of said first chamber and a portion of said second chamber; and a tube interconnecting the volumes of said first and second chambers and forming an integral gas-tight system therewith; said tube having a shape which prevents a direct line of sight between said first and second chambers through said tube; said gas-tight system being filled with an inert gas under several atmospheres' pressure.

3. A balanced detector system, comprising: first and second cylindrically shaped ionization chambers transversely spaced from each other and disposed with their longitudinal axes parallel; a non-linearly shaped tube interconnecting said chambers and forming an integral gas-tight system therewith for equalizing the pressure with said chambers and for preventing a direct line of sight between said chambers through said tube; said gas-tight system being filled with an inert gas under several atmospheres' pressure; and a lead shielding element disposed in the space between said transversely spaced chambers.

4. A balanced detector system as recited in claim 3 whrein said non-linear tube is U-shaped.

5. A balanced detector system as recited in claim 3 wherein said tube is non-linear in a plane transverse to the plane defined by said parallel axes of said first and second ionization chambers.

References Cited by the Examiner

UNITED STATES PATENTS

| 2,641,710 | 6/1953 | Pompeo et al. | 313—93 X |
| 2,836,726 | 5/1958 | Rich | 250—83.6 |
| 2,873,399 | 2/1959 | Garrison | 313—93 |
| 3,159,745 | 12/1964 | Schrodt et al. | 250—83.6 |

FOREIGN PATENTS

| 812,952 | 5/1959 | Great Britain. |

DAVID J. GALVIN, *Primary Examiner.*

BENNETT G. MILLER, *Examiner.*